Patented Oct. 19, 1948

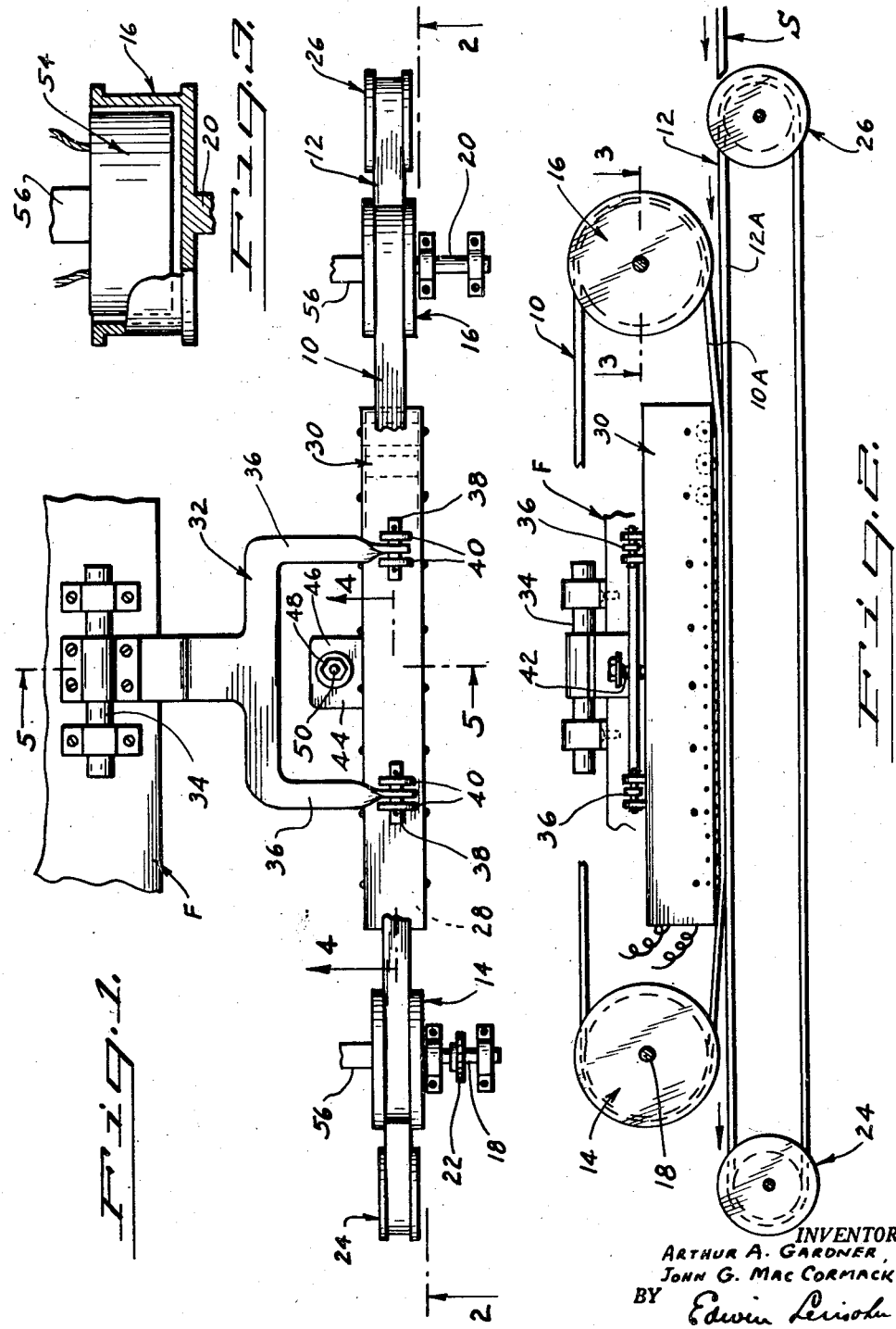
Oct. 19, 1948.  A. A. GARDNER ET AL  2,451,728
HEAT-SEALING APPARATUS
Filed April 17, 1945  2 Sheets-Sheet 1
INVENTORS
ARTHUR A. GARDNER, AND
JOHN G. MAC CORMACK
BY Edwin Leinsohn
ATTORNEY.

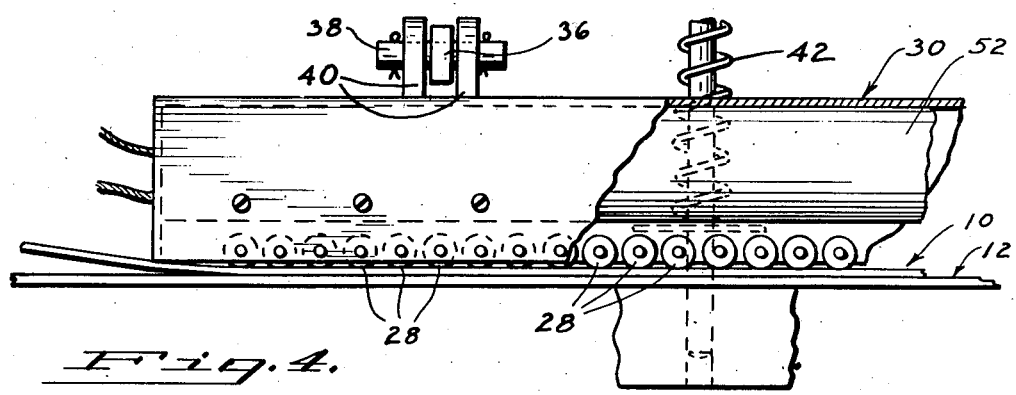
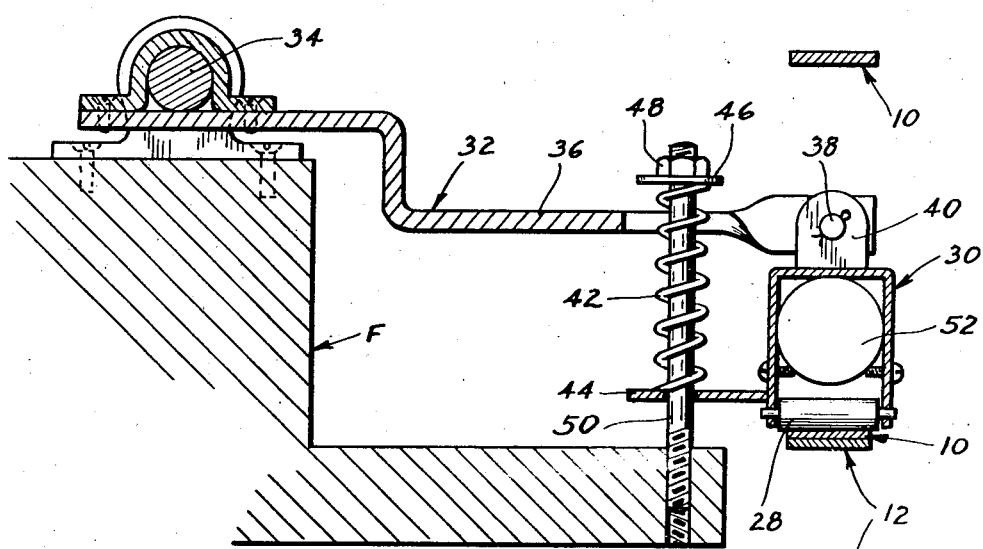
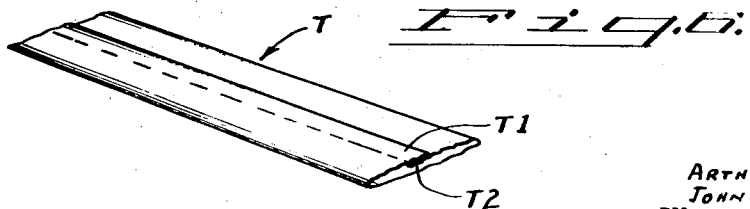

2,451,728

UNITED STATES PATENT OFFICE 2,451,728

HEAT-SEALING APPARATUS

Arthur A. Gardner and John G. MacCormack, New York, N. Y., assignors to Breslee Mfg. Company, New York, N. Y., a copartnership Application April 17, 1945, Serial No. 588,826

1 Claim. (Cl. 154—42)

This invention relates to heat-sealing apparatus.

The primary object of the present invention is to provide a heat-sealing apparatus constructed and arranged to apply heat and pressure by means of a pair of movable endless bands to overlapping portions of heat sealable material while the latter is conveyed by said bands.

Another object of the invention is to provide a heat-sealing apparatus of the endless band type with means for preheating the heat sealable material without the application of pressure thereto.

A yet further object of the invention is generally to improve the construction and operation of heat-sealing apparatus of the endless band type.

The above and other objects, features and advantages of the invention will be fully understood from the following description, considered in connection with the accompanying illustrative drawings.

In the drawings:

Fig. 1 is a plan view of a heat-sealing apparatus embodying the present invention, a portion of one of the endless bands being cut away for the purpose of illustration;

Fig. 2 is a view on the line 2—2 of Fig. 1;

Fig. 3 is a view on the line 3—3 of Fig. 2;

Fig. 4 is a view, on a larger scale, partly in elevation and partly in section, on the line 4—4 of Fig. 1;

Fig. 5 is a sectional view, on a larger scale, on the line 5—5 of Fig. 1;

Fig. 6 is a fragmentary perspective view of tubular material having overlapping marginal edge portions heat sealed to each other.

Referring now to the drawings in detail, the heat-sealing apparatus of the present invention comprises upper and lower endless bands 10 and 12, respectively, formed of steel or other suitable metal or heat conducting material. Band 10 passes over metal drums 14 and 16 carried and rotated by shafts 18 and 20, respectively. Drum 14 is driven by a sprocket wheel 22 or by any other suitable mechnism connected for power operation. The lower endless band 12 passes over rotary drums 24 and 26, drum 24 being preferably driven for moving band 12 at the same linear speed as band 10. The lower run of band 10 and the upper run of band 12 provide adjacent and confronting runs between which the heat sealable material is engaged for the heat-sealing operation during the travel of the two bands.

Provision is made for resiliently pressing the lower longitudinal run of band 10 against the adjacent upper or confronting longitudinal run of band 12. For this purpose and also for applying heat to band 10, a plurality of rollers 28 carried by a housing 30 are arranged to engage the upper surface of the lower run of band 10 (Figs. 4 and 5). Housing 30 is carried by a bracket 32 pivotally mounted at one end thereof on a shaft 34 carried by a stationary frame F. Bracket 32 is provided with forwardly extending arms 36 which are pivotally connected to the top of housing 30 by means of pins 38 carried by lugs 40 fixed to the top of said housing. The rollers 28 which are carried by housing 30 press against the lower arm of upper band 10 by gravity and are also urged against said run of the band by spring means, here shown as a compression spring 42 which, as clearly illustrated in Fig. 5, bears at one end thereof against a part 44 fixed to housing 30, the opposite end of said spring bearing against a washer 46 held adjustably by a nut 48 on a post 50 carried by a part of the stationary frame F. The pivotal connection of the housing 30 to bracket 32 provides for maintaining the band-engaging surfaces of rollers 28 in a horizontal plane.

An electric heater 52 of any suitable type is mounted within housing 30 for heating rollers 28 carried by said housing whereby to apply heat through said rollers to band 10. The heat sealable material, which for example, may be in the form of a tube T (Fig. 6), provided with overlapped marginal edge portions T1 and T2 which are to be heat sealed to each other is carried by and between bands 10 and 12 through the pressure and heat applying zone which extends longitudinally of housing 30 and for a substantial length of the confronting or companion runs or portions of bands 10 and 12.

We prefer to provide meas in addition to the heated rollers 28 for heating band 10. Thus as shown, an electric heater 54 is positioned within drum 16 in heat transmitting relation thereto. It will be understood that heater 54 is stationary and that drum 16 rotates around said heater. For this purpose, heater 54 may be carried by a part 56 mounted on a suitable support (not shown). If desired, a similar heater may be mounted in drum 14 as indicated by the heating support part 56, and also, if desired, either or both of the drums 24 and 26 may be provided with a stationary electric heater such as the electric heater 54. It will be understood that a heater may be placed in any one or more of the drums 14, 16, 24 and 26.

As shown in Fig. 2, a part 10A of the lower run of upper band 10, rearwardly of the companion runs of the two bands, is spaced from a confronting part 12A of the upper run of lower band 12 so that as the tubular material passes from the support S onto band 12, said tubular material passes through a pre-heating zone before it is subjected to the heat and pressure applied thereto by the roller engaged part of the lower run of band 10 in the heat and pressure applying zone extending longitudinally of housing 30. As a result of pre-heating the heat-sealable material, the latter is softened and thereby conditioned for securement under the action of the bands in the heat and pressure applying zone. This improves the sealing action of the bands and renders the latter effective on the heat-sealable material as soon as the latter enters the heat and pressure applying zone and makes it possible to speed up the travel of bands 10 and 12. The degree of pre-heating of the heat-sealable material can be regulated by the temperature of the preheating means and/or by the speed of travel of bands 10 and 12, and also by the length of the adjacent band portions 10A and 12A in the preheating zone, which may be varied by using bands 12 of different lengths as may be required. To enable the use of bands 12 of different lengths the shaft of drum 26 may be mounted in an adjustable bearing for increasing or decreasing the distance between the shafts of drums 26 and 24. It will be understood that the interior of tubular material 10 is provided with a strip of paper or other suitable means for preventing the inner surfaces of the opposite sides of said tubular material from adhering to each other, said paper being removed after the marginal portions T1 and T2 of the tubular material are heat-sealed to each other.

While we have shown and described the preferred embodiment of our invention, it will be understood that the latter may be embodied otherwise than as herein specifically illustrated or described and that in the apparatus herein disclosed, certain changes in the details of construction and in the arrangement of parts may be made without departing from the underlying idea or principles of the invention within the scope of the appended claim.

Having thus described our invention, what we claim and desire to secure by Letters Patent is:

In heat-sealing apparatus, upper and lower endless movable bands having adjacent and confronting longitudinally extending companion runs between which the heat sealable material is engaged during the travel of said bands, a housing positioned in the space between the upper and lower runs of the upper band, a bracket mounted for pivotal movement and pivotally connected to said housing, a plurality of rollers carried by said housing and engaging the lower run of said upper band, a heater in said housing for heating said rollers whereby to heat said rollers for heating said lower run of said upper band, and spring means connected to said housing for pressing the rollers against said lower run of the upper band.

ARTHUR A. GARDNER.
JOHN G. MacCORMACK.

REFERENCES CITED

The following references are of record in the file of this patent:

UNITED STATES PATENTS

| Number | Name | Date |
|---|---|---|
| 1,361,970 | Dickey | Dec. 14, 1920 |
| 1,949,419 | Johnson | Mar. 6, 1934 |
| 2,075,735 | Loomis | Mar. 30, 1937 |
| 2,107,249 | Hepke | Feb. 1, 1938 |
| 2,137,505 | Osgood | Nov. 22, 1938 |